Dec. 15, 1936.  C. A. SMITH  2,064,087
SUPPORT
Filed May 1, 1936
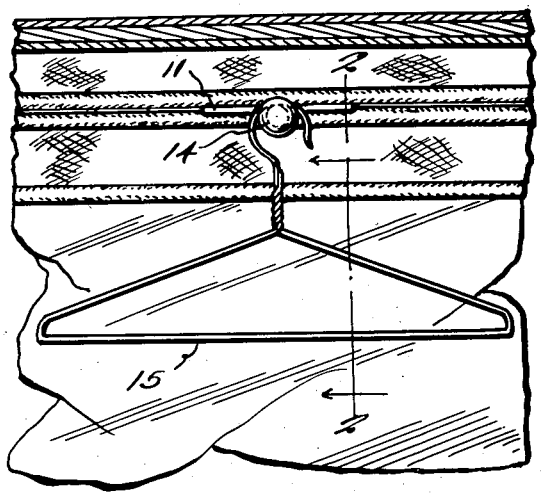
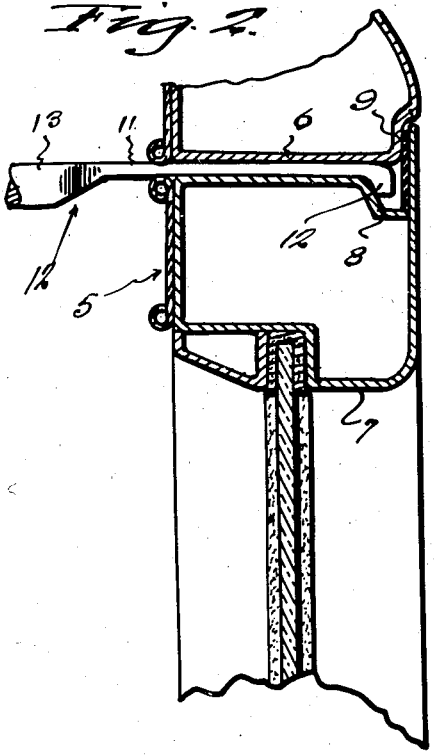
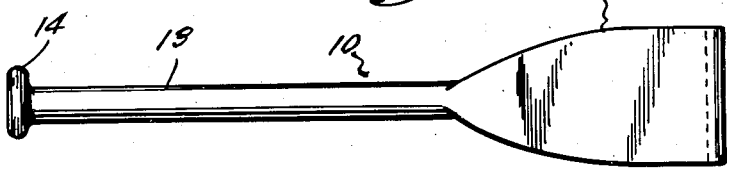
Inventor
Charles A. Smith
By Clarence A. O'Brien and
Hyman Berman
Attorney Patented Dec. 15, 1936

2,064,087

UNITED STATES PATENT OFFICE 2,064,087

SUPPORT

Charles A. Smith, Norwich, N. Y.

Application May 1, 1936, Serial No. 77,448

1 Claim. (Cl. 248—205)

This invention appertains to new and useful improvements in supports, and more particularly to a support for use in automobiles for supporting coats, hats, as well as hangers for coats and other garments.

A very important object of the invention is to provide a support which can be held in supporting position by any one of the doors of a vehicle in a manner which will permit displacement and removal of the support when the door is opened.

Other important objects and advantages of the invention will become apparent to the reader of the following specification.

In the drawing:

Figure 1 represents a fragmentary vertical sectional view through the body portion of an automobile showing the support held in place between the door and the jamb;

Figure 2 is a vertical sectional view on line 2—2 of Figure 1;

Figure 3 is a top plan view of the support;

Figure 4 is an edge elevational view of the support.

Referring to the drawing wherein like numerals designate like parts, it can be seen that the numeral 5 generally refers to the body construction of an automobile. Numeral 6 represents the jamb of the car body and numeral 7 represents the door of the vehicle. These automobile doors are normally provided at their tops with a drain groove 8. Sometimes this drain groove is located a short distance inwardly from the flange 9 and sometimes immediately adjacent the flange, as shown in Figure 2.

In carrying out the present invention, the support which is generally referred to by numeral 10 consists of a thin, substantially wide, blade-like structure 11 having a transversely extending rib 12 at its free end or at any desired intermediate point. Extending from this blade 11 is the cylindrical shank 13 terminating in a head or knob 14.

In placing the support in place, the blade-like portion 11 is set at an angle and the door slammed against the same so that the blade-like portion 11 is clamped between the jamb 6 of the car body and the door 7 so that the rib 12 will fit into the drain groove 8 to the end that the support cannot easily become displaced.

Obviously, coat hangers 15 and other items can be supported on the shank 13 of the support.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

A support of the class described comprising a rod having a headed end, a flat relatively thin portion adjacent its opposite end and a lateral projection outwardly of said flattened portion said flattened portion being capable of resting on the upper surface of a door between the door and its jamb and said lateral projection engaging the edge of the door to retain the support thereon when the support is clamped between the door and the jamb.

CHARLES A. SMITH.